United States Patent [19]

Phillips

[11] 3,758,568

[45] Sept. 11, 1973

[54] OXAMOYL SULFENYL CHLORIDES
[75] Inventor: Wendell Gary Phillips, Olivette, Mo.
[73] Assignee: Monsanto Company, Saint Louis, Mo.
[22] Filed: Sept. 1, 1971
[21] Appl. No.: 177,096

[52] U.S. Cl... 260/543 H, 260/239 BF, 260/293.85, 260/326.3, 424/244, 424/256, 424/274, 424/315
[51] Int. Cl...................... C07c 145/00, C07d 29/34
[58] Field of Search................... 260/534 H, 239 BF

[56] References Cited
FOREIGN PATENTS OR APPLICATIONS
1,224,720   3/1967   Germany ........................ 260/543 H OTHER PUBLICATIONS
Boehme et al. Liebig Annalen Vol. 576 pp. 61 (1951).
Boehme et al. Liebig Annalen Vol. 585 pp. 142 (1954).
Boehme et al. Liebig Annalen Vol. 602 p. 1 (1957).
Boehme et al. Liebig Annalen Vol. 606 p. 75 (1957).
Boehme et al. Berichte Vol. 87 p. 1661 (1954).
Kühel, Synthesis No. 11, Nov. 1970, pp. 561–580.

*Primary Examiner*—Lorraine A. Weinberger
*Assistant Examiner*—Richard D. Kelly
*Attorney*—Neal E. Willis, John L. Young et al.

[57] ABSTRACT

Oxamoyl sulfenyl chlorides are prepared from dichloromethane sulfenyl chlorides by reaction with sulfuric acid and water. The oxamoyl sulfenyl chlorides are pesticidally active and particularly useful as pre-emergent herbicides.

15 Claims, No Drawings

OXAMOYL SULFENYL CHLORIDES

This invention relates to oxamoyl sulfenyl chlorides of the formula

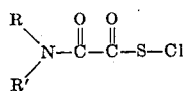

and their manufacture from the corresponding dichloromethane sulfenyl chlorides of the formula

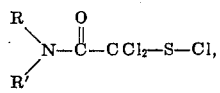

sulfuric acid, and water wherein R and R' are hydrogen, lower alkyl, benzyl, phenyl, substituted phenyl wherein the ring substituents thereof total from 1 to 3 same or different substituents selected from the group of substituents consisting of lower alkyl, lower alkoxy, halo, nitro, and trifluoromethyl, provided that the number of lower alkoxy substituents be from 0 to 2, the number of nitro substituents be from 0 to 2, and the number of trifluoromethyl substituents be from 0 to 2, substituted benzyl wherein the substituents are on the phenyl ring and are as defined for substituted phenyl, or R and R' when taken together are alkylene of the empirical formula $C_nH_{2n}$ wherein n is an integer from 4 through 8, inclusive, and having from 4 through 8 carbons in a continuous chain between the nitrogen terminal valence bonds.

Lower alkyl is alkyl having from 1 to 5 carbons. Examples of lower alkyl include, but are not limited to, methyl, ethyl, propyl, butyl, pentyl and the various isomeric forms thereof.

Lower alkoxy have from 1 to 5 carbons. Examples of alkoxy include, but are not limited to, methoxy, ethoxy, propoxy, butoxy, pentoxy and the various isomeric forms thereof.

Halo is a halogen selected from the group consisting of fluorine, chlorine, bromine and iodine.

Examples of heterocyclic groups of nitrogen and alkylene of the empirical formula $C_nH_{2n}$ wherein n is an integer from 4 through 8, inclusive, and having from 4 through 8 carbons in a continuous chain between the nitrogen terminal valence bonds include, but are not limited to, pyrrolidinyl, piperidinyl, hexameethyleneimino, heptamethyleneimino, octamethyleneimino, 2-ethylpyrrolidinyl, 3-butylpyrrolidinyl, 2,5-dimethylpyrrolidinyl, 2,5-diethylpyrrolidinyl, 3,4-dimethylpyrrolidinyl, 2-pipecolinyl, 3-pipecolinyl, 4-pipecolinyl, 2,6-dimethylpiperidinyl, 2-ethyl-6-methyl-piperidinyl, 2-propylpiperidinyl, 3-methylhexamethyleneimino, 3,4-dimethylhexamethylenoimino, and the various isomeric forms thereof.

The compounds of this invention are conveniently and efficiently prepared by the reaction of about equimolecular proportions of a dichloromethane sulfenyl chloride of the formula

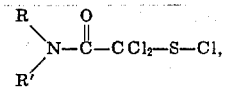

wherein R and R' have the aforementioned significance and water in the presence of sulfuric acid.

The reaction mass may consist only of the aforedescribed reactants and their reaction products or it may contain other organic or inorganic components in addition which are inert under the reaction conditions.

The amount of sulfuric acid present is not critical so long as it is present in an amount sufficient to dissolve at least a portion, or preferably all, of the dichloromethane sulfenyl chloride.

The sequence of addition of the reagents is not critical. The sulfuric acid may be added to the water before the sulfenyl chloride is added. Alternatively, a mixture of sulfuric acid and sulfenyl chloride may be poured onto a large excess of water. If the sulfuric acid is added to the water before the sulfenyl chloride is added, it is preferred that the amount of water, to which the sulfuric acid is added, not exceed 2½ molecular proportions per molecular porportion of sulfenyl chloride. It is more preferred that this amount of water not exceed 2 molecular proportions per molecular proportion of sulfenyl chloride.

The term, concentrated sulfuric acid, means sulfuric acid containing at least 95 percent by weight of $H_2SO_4$, i.e., commercially available concentrated sulfuric acid. Although in the method of this invention, it is more preferred to use concentrated sulfuric acid, sulfuric acid of lower concentrations of $H_2SO_4$ may also be used. Generally, it is preferred to use sulfuric acid containing at least 90 percent by weight of $H_2SO_4$.

A preferred method of preparation of the compounds of the present invention is first adding a mixture of substantially equimolecular proportions of water and a dichloromethane sulfenyl chloride to an excess of concentrated sulfuric acid (an excess being defined as any quantity greater than about 10 times the amount by weight of any other ingredient present) and then adding this reaction mass to an excess of an ice and water mixture. It is more preferred to agitate the initial water, sulfuric acid and sulfenyl chloride mass for a period of from about 30 seconds to about 2 hours before adding the mass to the ice and water mixture.

The reaction is normally carried out at a temperature above the freezing point of the system but preferably not above 30° Centigrade (°C.). Although the reaction may be conducted above 30°C., the yield of by-products from side reactions which form at increased temperatures becomes so great that yield of product normally drops off rapidly with further temperature increases. Still more preferably, the reaction is carried out at temperatures of from about 0°C. to about 25°C. The reaction is most conveniently carried out at room temperature, about 23°C. The reaction is usually carried out at atmospheric pressure, but higher or lower pressures may be utilized if equipment and other factors favor such higher or lower pressures. The reaction may be carried out in an open vessel or under reflux.

Oxamoyl sulfenyl chlorides of this invention are useful as biocides. Exemplary of such biocidal uses for these products is the control of nematodes, arachnids, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with the material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g., power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of dichloromethane sulfenyl chlorides, used as starting materials in the preparation of the compounds of the present invention, is taught in prior U.S. Pat. application Ser. No. 139,976 filed May 3, 1971, entitled "Substituted Alpha, Alpha-Dichloro-Methane Sulfenyl Chlorides and Their Manufacture."

As illustrative of this invention, but not limitative thereof, is the following:

EXAMPLE 1

To a suitable reaction vessel equipped with an agitator is charged approximately 100 milliliters (ml.) of concentrated sulfuric acid, approximately 7 grams (g.), about 0.02 moles, of 2,2-dichloro-2-(chlorothio)-meta-bromoacetanilide and approximately 0.4 g., about 0.02 moles, of water. The mass is stirred for about 20 minutes. Thereafter the mass is poured into a mixture of ice and water. A precipitate which forms during the period of stirring and increases in amount upon mixing with ice water is removed from the liquid portion of the reaction mass by filtration. The filtered solid is allowed to dry in air and then is dissolved in and recrystallized from about 60 ml. of chloroform. The light yellow solid is found to have a melting point of about 157° to 161°C., to be soluble in acetone, chloroform, ethanol, and dimethylformamide, and to be insoluble in water, and is identified by elemental analysis as meta-bromophenyloxamoyl sulfenyl chloride

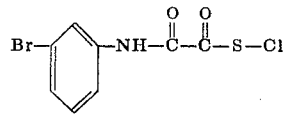

Calculated for $C_8H_5BrClNO_2S$: C, 32.62; H, 1.71; N, 4.76
Found: C, 32.63; H, 1.76; N, 4.73

EXAMPLE 2

To a suitable reaction vessel equipped with an agitator is charged approximately 1.8 g., about 0.1 moles, of water. To the water is added about 100 ml. of concentrated sulfuric acid. Approximately 25 g., about 0.074 moles, of 2,2-dichloro-2-(chlorothio)-meta-trifluoromethylacetanilide is thereafter added. The solution becomes homogeneous. After the mass is stirred for about one quarter hour at ambient room temperature, about 23°C, a precipitate appears. The reaction mass is poured into a mixture of ice and water. The solid precipitate is removed from the liquid by filtration, allowed to dry in the air overnight at ambient room temperature and then dissolved in and recrystallized from chloroform. Higher yields may be obtained by recrystallizing from benzene or petroleum ether instead of chloroform. The yellow solid is found to be soluble in diethyl ether, acetone, ethanol, chloroform, and dimethylformamide, to be insoluble in water, and to have a melting point of about 108° to 114°C. and is identified by elemental analysis as meta-trifluoromethylphenyloxamoyl sulfenyl chloride

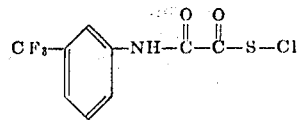

Calculated for $C_9H_5ClF_3NO_2S$: C, 38.11; H, 1.78; N, 4.94
Found: C, 38.32; H, 1.80; N, 4.86

EXAMPLE 3

To a suitable reaction vessel equipped with an agitator is charged approximately 50 ml. of concentrated sulfuric acid. Approximately 6 g., about 0.02 moles, of 2,2-dichloro-2-(chlorothio)-para-chloroacetanilide is added to and dissolved in the sulfuric acid. Approximately 1 g., about 0.03 moles, of acetonitrile is then added. The reaction mass is stirred for about 10 minutes and then poured into a mixture of ice and water. The precipitate which forms in the reaction mass upon contact with ice water is separated from the liquid portion of the reaction mass by filtration and is dissolved in and recrystallized from chloroform. The light yellow solid is found to have a melting point of about 172° to 174°C., to be soluble in acetone and dichloromethane, and to be insoluble in water and is identified by infrared and elemental analysis as parachlorophenyloxamoyl sulfenyl chloride

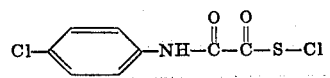

Calculated for $C_8H_5Cl_2NO_2S$: C, 38.42; H, 2.02; N, 5.60
Found: C, 38.23; H, 1.91; N, 5.57

EXAMPLES 4 THROUGH 25

The procedure of Example 1 is followed except that, in place of about 7 g. of 2,2-dichloro-2-(chlorothio)-meta-bromoacetanilide, an approximately equimolecular amount of the compound of Column A is charged and the product of Column B is obtained:

| Example: | A | B |
|---|---|---|
| 4 | 2,6-(CH₃)₂-C₆H₃-NH-C(O)-CCl₂-S-Cl | 2,6-(CH₃)₂-C₆H₃-NH-C(O)-C(O)-S-Cl |
| 5 | 3-CH₃-C₆H₄-N(C₂H₅)-C(O)-CCl₂-S-Cl | 3-CH₃-C₆H₄-N(C₂H₅)-C(O)-C(O)-S-Cl |
| 6 | 4-C₂H₅-C₆H₄-N((CH₂)₄CH₃)-C(O)-CCl₂-S-Cl | 4-C₂H₅-C₆H₄-N((CH₂)₄CH₃)-C(O)-C(O)-S-Cl |
| 7 | 2,6-(CH₃CH)₂-4-(CH₃CH)-C₆H₂-N(CH₂CH(CH₃)₂)-C(O)-CCl₂-S-Cl | 2,6-(CH₃CH)₂-4-(CH₃CH)-C₆H₂-N(CH₂CH(CH₃)₂)-C(O)-C(O)-S-Cl |
| 8 | C₆H₅-N(C₆H₅)-C(O)-CCl₂-S-Cl | C₆H₅-N(C₆H₅)-C(O)-C(O)-S-Cl |
| 9 | 4-CH₃O-C₆H₄-CH₂-N((CH₃)₃C)-C(O)-CCl₂-S-Cl | 4-CH₃O-C₆H₄-CH₂-N((CH₃)₃C)-C(O)-C(O)-S-Cl |
| 10 | C₆H₅CH₂-N(C₆H₅)-C(O)-CCl₂-S-Cl | C₆H₅CH₂-N(C₆H₅)-C(O)-C(O)-S-Cl |
| 11 | CH₃(CH₂)₃-N(CH₃(CH₂)₃)-C(O)-CCl₂-S-Cl | CH₃(CH₂)₃-N(CH₃(CH₂)₃)-C(O)-C(O)-S-Cl |
| 12 | (CH₂)₄N-C(O)-CCl₂-S-Cl | (CH₂)₄N-C(O)-C(O)-S-Cl |
| 13 | (CH₂)₅N-C(O)-CCl₂-S-Cl | (CH₂)₅N-C(O)-C(O)-S-Cl |
| 14 | 2,6-(CH₃-CH-CH₂)₂-morpholino-N-C(O)-CCl₂-S-Cl | 2,6-(CH₃-CH-CH₂)₂-morpholino-N-C(O)-C(O)-S-Cl |
| 15 | (CH₃)(C₆H₅CH₂)N-C(O)-CCl₂-S-Cl | (CH₃)(C₆H₅CH₂)N-C(O)-C(O)-S-Cl |
| 16 | 2-(CH₂CH(CH₃)₂)-C₆H₄-N(CH₃)-C(O)-CCl₂-S-Cl | 2-(CH₂CH(CH₃)₂)-C₆H₄-N(CH₃)-C(O)-C(O)-S-Cl |

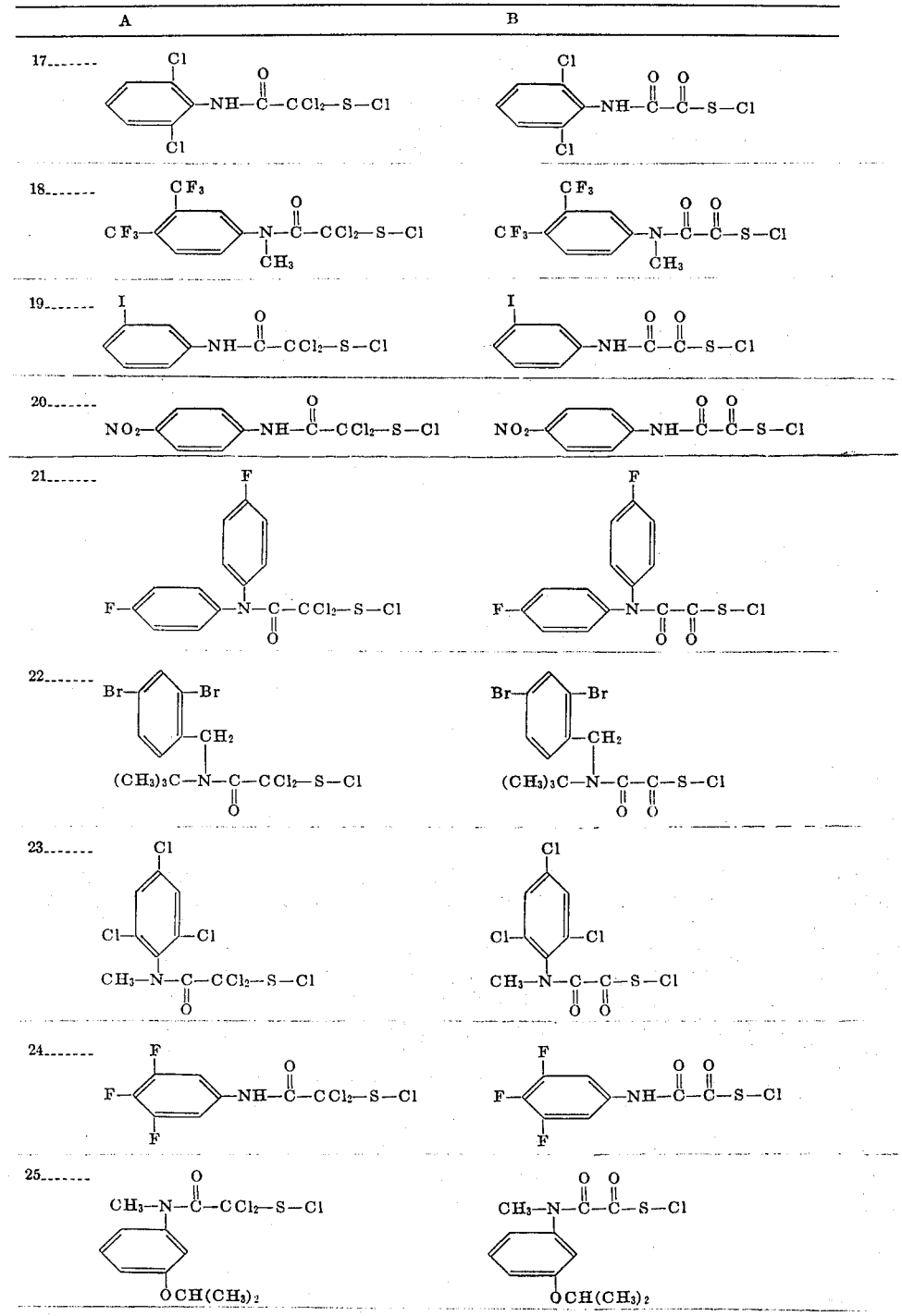

EXAMPLE 26

Contact herbicidal activity of representative oxamoyl sulfenyl chlorides of this invention is determined by the following procedure:

The compound to be tested is applied in spray form to plants of a given age of several grasses and broadleaf species. After the plants are the desired age, each aluminum pan is sprayed with a given volume of a 0.2 percent concentration solution of the candidate chemical, corresponding to a rate of approximately 4 lbs. per acre. This solution is prepared from an aliquot of a 2 percent solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compound prepared in Example 3 is observed against lambsquarter, Canada thistle, cocklebur, and morning glory.

EXAMPLE 27

Pre-emergent herbicidal activity of representative oxamoyl sulfenyl chlorides of this invention is determined by the following procedure:

A good grade of top soil is placed in aluminum pans and compacted to a depth of three-eighths to one-half inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compound prepared in Example 1 is observed against Canada thistle, morning glory, and lambsquarters. Pre-emergent activity of the compound prepared in Example 2 is observed against quackgrass. Pre-emergent activity of the compound prepared in Example 3 is observed against quackgrass and Johnson grass.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. An oxamoyl sulfenyl chloride of the formula

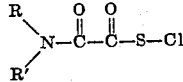

wherein R and R' are hydrogen, lower alkyl, benzyl, phenyl, substituted phenyl wherein the ring substituents thereof total from 1 to 3 same or different substituents selected from the group of substituents consisting of lower alkyl, lower alkoxy, halo, nitro, and trifluoromethyl, provided that the number of lower alkoxy substituents be from 0 to 2, the number of nitro substituents be from 0 to 2, and the number of trifluoromethyl substituents be from 0 to 2, substituted benzyl wherein the substituents are on the phenyl ring and are as defined for substituted phenyl, or R and R' when taken together are alkylene of the empirical formula $C_nH_{2n}$ wherein $n$ is an integer from 4 through 8, inclusive, and having from 4 through 8 carbons in a continuous chain between the nitrogen terminal valence bonds.

2. A compound of claim 1 wherein R is hydrogen.
3. A compound of claim 2 wherein R' is substituted phenyl.
4. A compound of claim 3 wherein the ring substituents are halo.
5. A compound of claim 4 wherein the halo is chlorine.
6. The compound of claim 5 wherein R' is para-chlorophenyl.
7. A compound of claim 4 wherein the halo is bromine.
8. The compound of claim 7 wherein R' is meta-bromophenyl.
9. A compound of claim 3 wherein the ring substituents are trifluoromethyl.
10. The compound of claim 9 wherein R' is metatrifluoromethylphenyl.
11. A compound of claim 1 wherein R and R', taken together, are alkylene of the empirical formula $C_nH_{2n}$ wherein $n$ is an integer from 4 through 8, inclusive, and having from 4 through 8 carbons in a continuous chain between the nitrogen terminal valence bonds.
12. A compound of claim 2 wherein R' is substituted benzyl.
13. A compound of claim 2 wherein R' is lower alkyl.
14. A compound of claim 1 wherein R and R' are each lower alkyl.
15. A compound of claim 2 wherein R is lower alkyl and R' is substituted phenyl.

* * * * *